United States Patent [19]

Chiu et al.

[11] Patent Number: 5,315,604
[45] Date of Patent: May 24, 1994

[54] OPTICAL STRUCTURE FOR ADJUSTING THE PEAK POWER OF A LASER BEAM

[75] Inventors: George Chiu, Cross River, N.Y.; Rama N. Singh, Bethel, Conn.; Janusz S. Wilczynski, Ossining, N.Y.

[73] Assignee: International Business Machines Corporation, Armonk, N.Y.

[21] Appl. No.: 10,207

[22] Filed: Jan. 28, 1993

[51] Int. Cl.$^5$ .............................. G01B 9/02
[52] U.S. Cl. ........................... 372/25; 372/99; 372/700; 219/121.76
[58] Field of Search ............ 372/700, 25, 99, 107; 219/121.76, 121.77

[56] References Cited

U.S. PATENT DOCUMENTS

| | | | |
|---|---|---|---|
| 3,463,924 | 8/1969 | Culshaw et al. | 250/199 |
| 3,464,026 | 8/1969 | Woodbury et al. | 331/94.5 |
| 3,700,334 | 10/1972 | Low et al. | 356/106 |
| 3,881,823 | 5/1973 | De Lang et al. | 356/106 |
| 4,059,759 | 11/1977 | Harney et al. | 250/206 |
| 4,114,018 | 9/1978 | Von Allmen et al. | 219/121 |
| 4,180,324 | 12/1979 | Primbsch | 356/35.5 |
| 4,188,122 | 2/1980 | Massie et al. | 356/349 |
| 4,224,096 | 9/1980 | Osborne | 156/380 |
| 4,335,939 | 6/1982 | Stovell et al. | 350/385 |
| 4,632,556 | 12/1986 | Akatsu | 356/351 |
| 4,752,668 | 6/1988 | Rosenfield et al. | 219/121 |
| 4,776,699 | 10/1988 | Yoshizumi | 356/349 |
| 4,925,523 | 5/1990 | Braren et al. | 156/643 |

OTHER PUBLICATIONS

"Introduction to Lasers and Their Applications", O'Shea et al., 1977, pp. 36-39.

Primary Examiner—Rodney B. Bovernick
Assistant Examiner—Hemang Sanghavi
Attorney, Agent, or Firm—Perman & Green

[57] ABSTRACT

Structure is disclosed for the ablation of material by the use of a laser beam wherein the laser provides a beam which is directed through an illumination and projection optical system for imaging on the material which is to be ablated. In the present invention the peak power of the laser beam is adjustable. The laser beam peak power adjustment structure includes a laser that provides a pulsed beam. The laser beam is directed into a beam splitter wherein the laser beam is split into two beam components. The first beam component passes through beam splitter with negligible or no delay, then passes through a quarter waveplate and impinges on a first mirror which reflects it back to the beam splitter. The second beam component is directed at an angle of 90 degrees by the beam splitter and toward a second mirror. The second mirror is at a predetermined distance from the beam splitter which introduces a total predetermined delay for the reflected second beam component as it is directed back to the beam splitter. The reflected first beam component and the delayed reflected second beam component are combined at the beam splitter to form a third beam which passes from the beam splitter toward the conventional optical column for the ablation tool including the mask and target. The resultant third beam directed to the mask therefore consists of original beam pulses and delayed beam pulses which combine to reduce the peak power of the third beam component.

8 Claims, 3 Drawing Sheets

OPTICAL STRUCTURE FOR ADJUSTING THE PEAK POWER OF A LASER BEAM

BACKGROUND OF THE INVENTION

1. Field of the Invention

The present invention relates to laser apparatus used as tools to process materials, and more particularly, to an optical system for laser apparatus for adjusting the peak power of the laser beam.

2. Background Art

Heretofore, lasers have been employed for selectively ablating material from a workpiece by the use of laser beam radiation and more particularly to ablating metal and/or dielectric workpieces by a pulse or pulses of laser beam radiation.

The selective removal of the material by laser radiation is well known. However, these techniques are not efficient and the processes cannot be controlled with sufficient precision. Processes known to the prior art characteristically provide undesirable side effects such as damage to the system illumination and projection optics by the peak power of the laser beam.

References describing the technique of laser ablation include U. S. Pat. No. 4,925,523 issued May 15, 1990 to Braren et al entitled "Enhancement of Ultraviolet Laser Ablation and Etching Organic Solids U.S. Pat. No. 4,752,668 issued Jan. 21, 1988 to Rosenfield et al entitled "System for Laser Removal of Excess Material from a Semiconductor Wafer" and U.S. Pat. No. 4,114,018 issued Sep. 12, 1978 to Von Allmen et al entitled "Method for Ablating Metal Workpieces with Laser Radiation".

In the present invention laser apparatus for material ablation is provided which employs techniques which use known optical structures such as beam splitters, polarizers, waveplates, mirrors and beam expanders. References that use these optical structures in combination for a variety of applications include U.S. Pat. No. 3,463,924 issued Dec. 16, 1966 to Culshaw et al entitled "Opposite Circularly-Polarized Optical Heterodyne Detection System. U.S. Pat. No. 3,464,026 issued Aug. 26, 1969 to Woodbury et al entitled "Laser Using Porro Prism End Reflectors". U.S. Pat. No. 3,700,334 issued Oct. 24, 1972 to Low et al entitled "Interferometer-Polarimeter". U.S. Pat. No. 3,881,823 issued May 6, 1975 to DeLang et al entitled "Apparatus for Measuring the Variation of an Optical Path Length with the Aid of an Interferometer". U.S. Pat. No. 4,059,759 issued Nov. 22, 1977 to Harney et al entitled "Passive and Active Pulse Stacking Scheme for Pulse Shaping". U.S. Pat. No. 4,180,324 issued Dec. 25, 1979 to Primboch entitled "Method and Apparatus for Measuring Deformation of a Workpiece Surface Responsive to Ultrasonic Energy". U.S. Pat. No. 4,188,122 issued Feb. 12, 1980 to Massie et al entitled "Interferometer". U.S. Pat. No. 4,224,096 issued Sep. 23, 1980 to Osborne entitled "Laser Sealing of Thermoplastic Material". U.S. Pat. No. 4,335,939 issued Jan. 22, 1982 to Stovell et al entitled "Optical Modulators and Apparatus Including Such Modulators".

SUMMARY OF THE INVENTION

An object of the present invention is to provide a laser apparatus for material ablation wherein the peak power of the laser beam can be adjusted.

Another object of the present invention is to provide a laser apparatus for material ablation wherein the peak power of the laser beam can be reduced while the amount of fluence to ablate the material remains the same.

A further object of the present invention is to provide a laser apparatus for material ablation wherein the peak power of the laser beam is adjusted over a predetermined range by employing a beam splitter with an adjustable path length.

Other objects and features of the invention will be disclosed by referring to the drawing, the description of the embodiment and the claims that follow:

DESCRIPTION OF THE INVENTION

In the process of ablation of material by the use of a laser beam, the laser provides a beam which is directed through an illumination and projection optical system for imaging onto the material which is to be ablated. The optical system can be damaged by the peak power of the laser beam. Also, in practice, different lasers may be employed with the optical system, and the lasers may have different beam profiles, repetition rates and power levels, all of which result in different peak powers responsible for damaging the illumination and projection optics. Improvements in laser technology will result in more powerful laser devices which will increase these problems. One solution is to attenuate the laser beam power, but this reduces the throughput of the ablation tool. Another solution is to redesign the illumination and projection optics for each different laser. This is costly and inefficient.

The present invention provides a laser system wherein the peak power of the laser beam is adjustable, and therefore different lasers can be used with the illumination and projection optics and the beam power can be adjusted accordingly.

Figure 1:
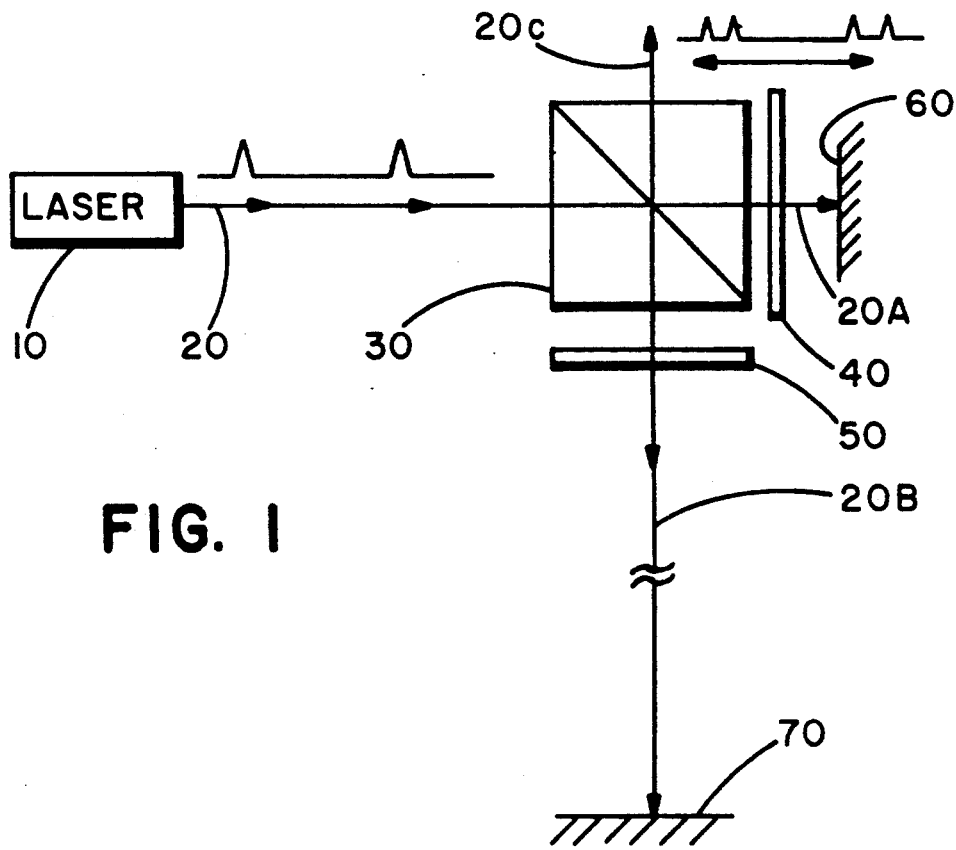
FIG. 1 is a schematic illustration of an embodiment of a laser apparatus for ablating material wherein the peak power of the laser light is adjustable in accordance with the principles of the present invention.

Referring to FIG. 1, a schematic illustration of a laser beam peak power adjustment structure is shown. The laser 10 provides a pulsed beam 20. Laser 10 may, for purposes of explanation, be a 308 nm Xe Cl laser which produces a plurality of pulses which occur 3 milliseconds apart. The laser beam 20 is directed into a beam splitter 30 wherein the laser beam 20 is split into two beams, 20A and 20B. Beam 20A passes through beam splitter 30 with negligible or no delay, passes through a quarter waveplate 40 and impinges on mirror 60 which reflects it back to the beam splitter 30. Although the beam splitter 30 is shown as a beam splitting cube, other beam splitting means may be employed, such as, plane parallel plate beam splitters.

Beam 20B is directed at an angle of 90 degrees by beam splitter 30 and toward mirror 70. Mirror 70 is at a predetermined distance from beam splitter 30 which introduces a total predetermined delay for the reflected beam 20B as it is directed back to beam splitter 30.

The reflected beam 20A and the delayed reflected beam 20B are combined at beam splitter 30 to form beam 20C which passes from beam splitter 30 toward the conventional optical column for the ablation tool including the mask and target.

As an example, the pulses of the beam 20 from laser 10 may be spaced 3 ms apart. Beam 20A experiences no delay so it also consists of pulses 3 ms apart. Beam 20B returns to beam splitter 30 with a delay due to the path length, which for example results in the pulses delayed by 50 nanoseconds. The resultant beam 20 directed to the mask therefore consists of the original pulses and the delayed pulses which combine to reduce the peak power.

Figure 2:
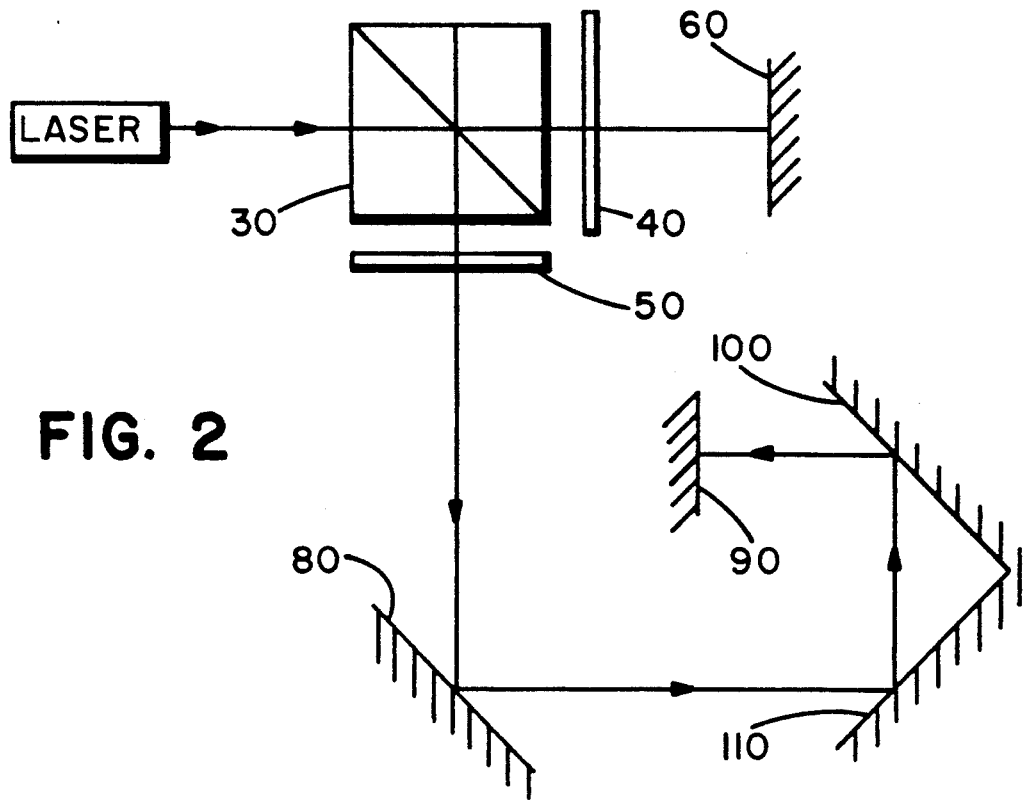
FIG. 2 is a schematic illustration of a laser apparatus according to the principles of the present invention which includes a folded mirror structure for providing a compact optical path length.
Figure 5A:
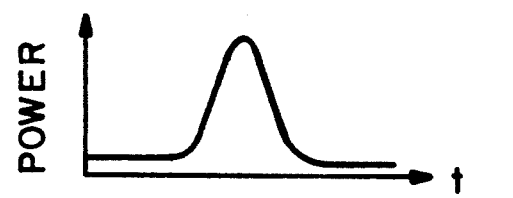
FIGS. 5 A, 5B, 5C and 5D are illustrations of a series of waveforms useful in the explanation of the present invention.
Figure 5B:
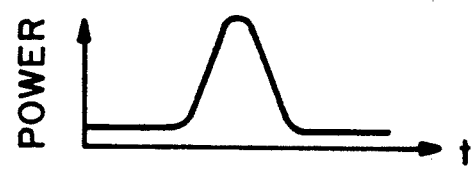
Figure 5C:
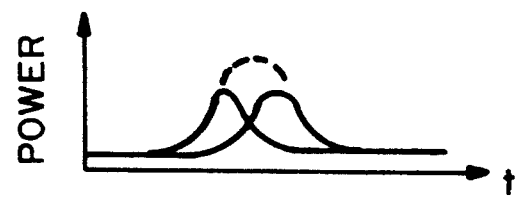
Figure 5D:
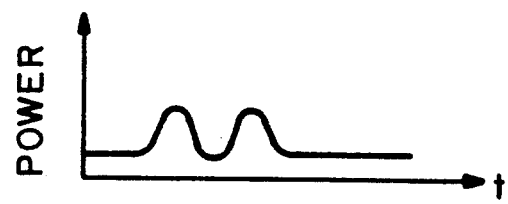

Referring to FIG. 5A, a waveform is shown that illustrates a pulse of the original beam 20. FIG. 5B is an illustration of the delayed pulse of beam 20B returned to beam splitter 30 from mirror 70. FIG. 5C is an illustration of the beams of 20A and 20B of FIG. 1 being combined in beam splitter 30, and FIG. 5C illustrates the resultant beam 20C directed toward the system mask. The resultant beam 20C will have a reduction of the peak power of the original beam 20 which can be controlled as a function of the path distance delay of beam 20B. FIG. 5D illustrates two pulses delayed sufficiently far apart. A path difference of zero produces a resultant beam 20C identical to and having the same power as original beam 20. A path difference which produces a pulse delay of one pulse width provides a resultant beam 20C having 50 percent of the peak power of beam 20. By adjusting the path difference to produce pulse delays between zero and one pulse width, the peak power of the beam 20 can be controlled over a range from 100 percent to 50 percent of the peak power of the original beam 20 from laser 10. Because the adjustment control of the peak power of the ablation beam of the present invention is a function of the path length of beam 20B, the structure can be made more compact by folding the path distance by using additional mirrors, Referring to FIG. 2, the beam 20B is reflected from mirrors 80, 110, 100 and 90 which are disposed at angles so that the total path length between mirror 90 and the beam splitter is contained in a more compact space.

Figure 3:
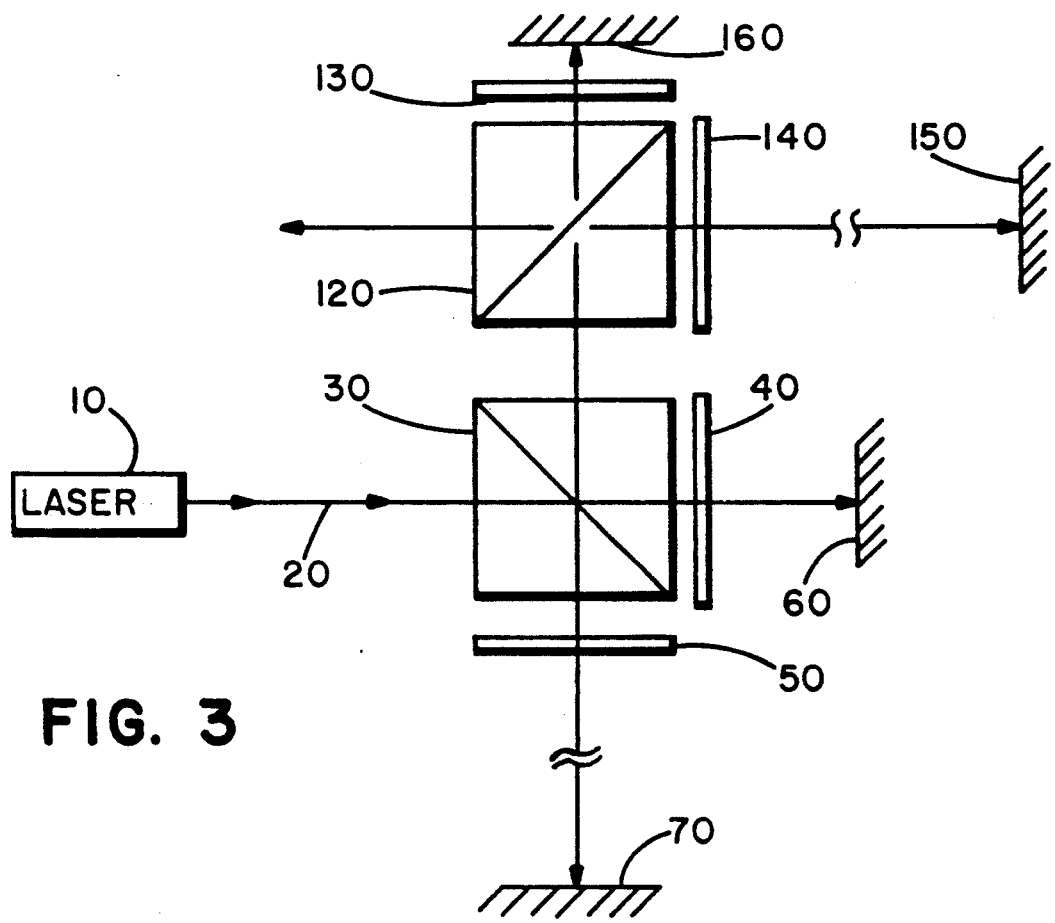
FIG. 3 is a schematic illustration of an embodiment of the present invention using at least one additional beam-splitting structure.

As previously stated, the reduction of the peak power of the embodiment of FIG. 1 can be reduced to 50 percent. If a greater than 50 percent reduction is desired, additional beam splitter structures may be employed. In the embodiment of FIG. 3, the resultant beam 20C (of FIG. 1) is introduced to a second beam splitter 120 where it is split into two orthogonal beams 20D and 20E. Additional quarter waveplates 130, 140 and additional mirrors 150, 160 are provided and a pulse delay and re-combination occurs just as described for the embodiment of FIG. 1. The resultant beam 20F directed toward the mask may now have a peak power that can be varied from the original value of beam 20 down to 25 percent of the peak power of beam 20. Further stages of beam splitters can be added to increase the range over which the peak power can be controlled.

Figure 4:
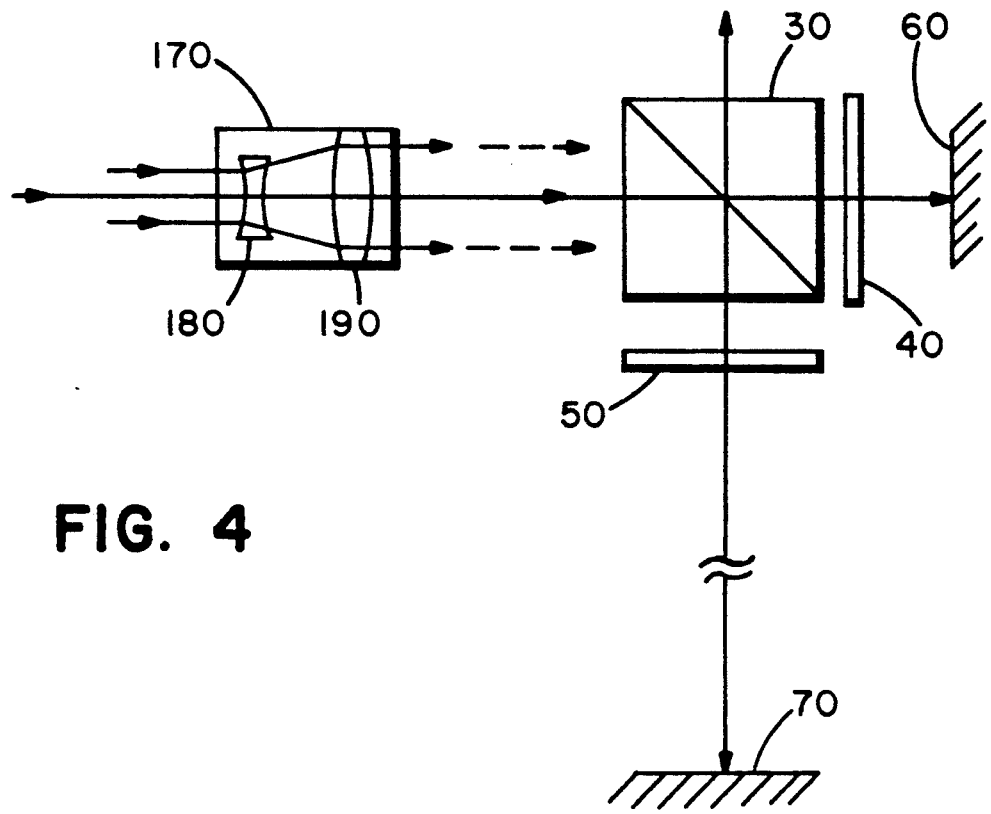
FIG. 4 is a schematic illustration of an embodiment of the present invention incorporating a beam expander for rendering the power density of the laser beam.

In the event that the power density of the beam 20 from the laser 10 is very high, a beam expander 170 including a concave lens 180 and a convex lens 190 can be introduced into the beam path as illustrated in FIG. 4 to reduce the power density to the optical structures.

The reduction of the peak power of the pulsed laser beam is a function of the time delay between the pulses of the two component laser beams from the beam splitter. Thus, although beam 20A was described as having a zero delay, an embodiment is possible wherein the component beam 20A has a first delay other than zero. The second beam 20B has a second delay, and the beam 20C has a peak pulse power dependent on the first and second delays.

What has been described is an optical structure for adjusting the power of a laser beam, and which can control the adjustment over a desired range.

While the invention has been particularly shown and described with respect to a preferred embodiment thereof, it will be understood by those skilled in the art that changes in form and details may be made therein without departing from the scope and spirit of the invention. For example, the disclosed embodiment described an ablation tool, however, the present invention can also be used with any integrated circuit repair, packaging, direct write lithography and projection printing lithography tools.

We claim:

1. An optical structure for adjusting the peak power of a pulsed laser beam from a laser comprising:
    at least one beam splitting means disposed in the path of a pulsed laser beam consisting of a sequence of pulses occurring at the same fixed time intervals for splitting said pulsed, laser beam into first and second component pulsed laser beams, wherein said second component pulsed laser beam is directed in a path different from the path of said first component pulsed laser beam,
    first reflective means in the path of said first component pulsed laser beam for reflecting said first component pulsed laser beam back to said beam splitting means with a first amount of pulse time delay applied to said pulses occurring at said fixed time intervals,
    second reflective means in the path of said second component pulsed laser beam for reflecting said second component pulsed laser beam back to said beam splitting means with a second amount of pulse time delay applied to said pulses occurring at said fixed time intervals,
    said first and second reflected component pulsed laser beams containing said timed delayed pulses having said first and second amount of time delay being combined at said beam splitter to form a third pulsed laser beam wherein said third pulsed laser beam that includes said combined time delayed pulses from said first and second reflected component pulsed laser beams and has a peak power less than the peak power of said pulsed laser beam from said laser.

2. An optical structure for adjusting the peak power of a pulsed laser beam according to claim 1 wherein said peak power of said third pulsed laser beam is a function of the difference between the pulse delay of said first reflected component pulsed laser beam and said second reflected component pulsed laser beam.

3. An optical structure for adjusting the peak power of a pulsed laser beam according to claim 2 wherein the amount of pulse delay of said first reflected component laser beam is minimal.

4. An optical structure for adjusting the peak power of a pulsed laser beam according to claim 2 wherein said optical structure further includes a projection optic stage for directing a beam of energy onto a target, and wherein said third pulsed laser beam is directed through said projection optic stage onto said target.

5. An optical structure for adjusting the peak power of a pulsed laser beam according to claim 2 wherein said beam splitting means includes a beam splitting prism which transmits said first component of said pulsed laser beam and which reflects said second component of said pulsed laser beam, a first quarter waveplate in the path of said first component of said pulsed laser beam and a second quarter waveplate in the path of said second component of said pulsed laser beam.

6. An optical structure for adjusting the peak power of a pulsed laser beam according to claim 2 wherein said second reflective means in the path of said second pulsed laser beam includes a plurality of separate reflective elements disposed at angular positions wherein said second component pulsed laser beam is reflected along a series of angular paths to and from said beam splitting means.

7. An optical structure for adjusting the peak power of a pulsed laser beam according to claim 2 further including at least a second beam splitting means in the path of said third pulsed laser beam for splitting said third pulsed laser beam into fourth and fifth component pulsed laser beams wherein said fifth component pulsed laser beam is directed in a path different from the path of said fourth component pulsed laser beam, third reflective means in the path of said fourth component pulsed laser beam for reflecting said fourth component pulsed laser beam back to said second beam splitting means with at first amount of pulse time delay and fourth reflective means in the path of said fifth component pulsed laser beam splitting means with a second amount of pulse time delay, said fourth and fifth reflected component pulsed laser beams containing said time delayed pulses having said first and second amount of time delay being combined at said beam splitter to form a sixth pulsed laser beam that includes said combined pulses from said third and fourth reflected component pulsed laser beams and has a peak power less than the peak power of said third pulsed laser beam.

8. An optical structure for adjusting the peak power of a pulsed laser beam according to claim 6 further including at least a second beam splitting means in the path of said third pulsed laser beam for splitting said third pulsed laser beam into fourth and fifth component pulsed laser beams wherein said fifth component pulsed laser beam is directed in a path different from the path of said fourth component pulsed laser beam, third reflective means in the path of said fourth component pulse laser beam for reflecting said fourth component pulsed laser beam back to said second beam splitting means with at first amount of pulse delay and fourth reflective means in the path of said fifth component pulsed laser beam splitting means with a second amount of pulse delay, said fourth and fifth reflected component pulsed laser beams being combined at said beam splitter to form a sixth pulsed laser beam that includes said combined pulses from said third and fourth reflected component pulsed laser beams and has a peak power less than the peak power of said third pulsed laser beam.

* * * * *